Jan. 2, 1940.   L. W. WELCH ET AL   2,185,485
METHOD OF MAKING HEAT EXCHANGE DEVICES
Original Filed May 2, 1938   2 Sheets-Sheet 1
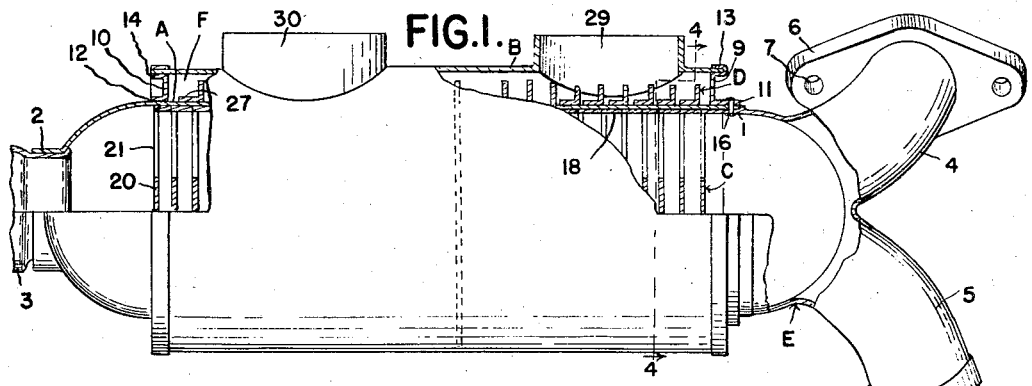
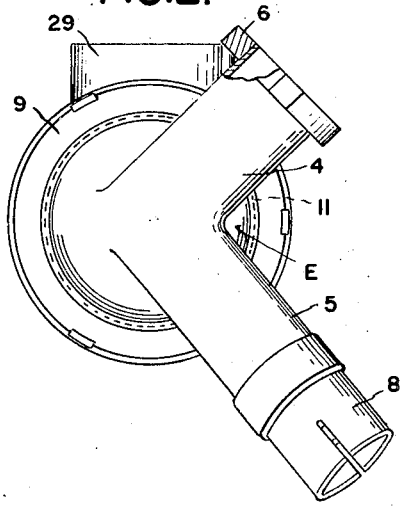
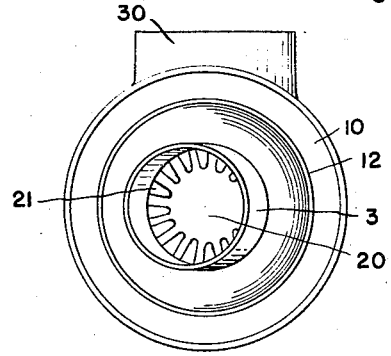
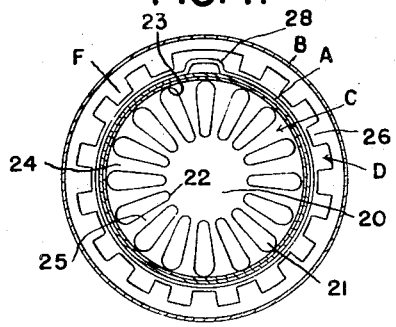
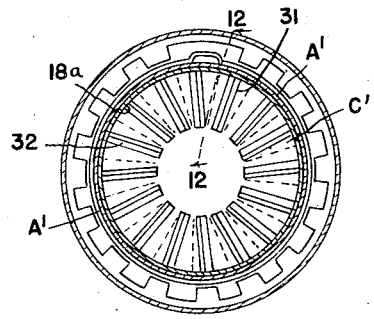
INVENTORS
LEWIS W. WELCH
ALFRED F. MILLINGTON
BY
ATTORNEYS Jan. 2, 1940.　　　L. W. WELCH ET AL　　　2,185,485
METHOD OF MAKING HEAT EXCHANGE DEVICES
Original Filed May 2, 1938　　2 Sheets-Sheet 2

INVENTORS
LEWIS W. WELCH
BY　ALFRED F. MILLINGTON
ATTORNEYS

Patented Jan. 2, 1940

2,185,485

UNITED STATES PATENT OFFICE 2,185,485

METHOD OF MAKING HEAT EXCHANGE DEVICES

Lewis W. Welch, Dearborn, and Alfred F. Millington, Northville, Mich., assignors, by mesne assignments, to The Manufacturers National Bank of Detroit, Detroit, Mich., a national banking association Original application May 2, 1938, Serial No. 205,576. Divided and this application February 20, 1939, Serial No. 257,488

3 Claims. (Cl. 113—118)

This invention relates generally to the manufacture of heat exchange devices such as vehicle heaters in which air from the atmosphere is heated by the exhaust gases from the engine of the vehicle, and constitutes a division of our application filed May 2, 1938, bearing Serial No. 205,576.

One of the essential objects of the invention is to form the main elements of the heater in such a way that they may be easily and quickly assembled and readily and effectively united by a hydrogen electric brazing operation.

Another object is to construct the essential heater parts in such a way that they not only facilitate the brazing operation, but also serve more effectively as heater elements to insure that the maximum amount of heat from the exhaust gases will be absorbed by the air before the latter is discharged through the outlet of the heater to the interior of the vehicle to be heated.

Another object is to assemble and braze the essential parts of the heater in such a way that the copper or other brazing metal used in the brazing operation cooperates with such parts of the heater to insure against leaks.

Other objects, advantages and novel details of construction of this invention will be made more apparent as this description proceeds, especially when considered in connection with the accompanying drawings, wherein:

Figure 1 is a side elevation of a heater embodying our invention, having parts broken away and in section;

Figure 2 is a front end elevation thereof with parts broken away and in section;

Figure 3 is a rear end elevation of the heater illustrated in Figure 1;

Figure 4 is a cross sectional view taken substantially on the line 4—4 of Figure 1;

Figure 11 is a view similar to Figure 4, but showing a slight modification;

Figure 7:
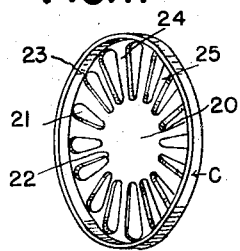
Figure 7 is a detail perspective view of one of the baffles.

Referring now to the drawings, A is the inner shell, B is the outer shell, C are the baffles, and D are the fins of a heater embodying our invention.

As shown, the inner shell A is tubular in configuration and is formed from sheet metal. Preferably the forward end thereof is open to receive an annular portion 1 of a cast metal header E, while the rear end portion is drawn to provide a reduced neck 2 for an outlet or tail pipe 3.

The header E has two tubular branches 4 and 5, respectively, forming inlets for the exhaust gases from a V-type engine (not shown). A machined plate 6 is fixed upon the outer end of the branch 4 and is provided with suitable openings 7 for the reception of bolts or other headed elements (not shown) for attaching the branch 4 to the exhaust manifold of an engine, while a tube 8 is anchored within the outer end of the branch 5 and is adapted to receive an end of the usual cross-over exhaust pipe of the engine. The tail pipe 3 telescopically engages the neck 2 of the inner shell and preferably extends at a slight angle to the axis of the heater.

The outer shell B is substantially concentric with the inner shell A and is held in proper spaced relation thereto by annular headers 9 and 10. Preferably these headers 9 and 10 are provided at their inner edges with lateral flanges 11 and 12, respectively, that are sleeved on the inner shell A and are provided at their outer edges with lateral flanges 13 and 14 of U-cross section that embrace and are secured to the ends of the outer shell. In the present instance, opposite ends of the outer shell have tongues 15 that extend through and are pressed against the lower sides of the U-shape flanges. The lateral flange 11 of the forward header 9 is secured to the inner shell A by a hydrogen electric brazing operation, while the lateral flange 12 of the rear header is free to slide on said inner shell to compensate for contraction and expansion of the outer shell while the heater is in use.

Initially the lateral flange 11 of the forward header and the annular portion 1 of the casting are held in fixed relation respectively upon the outer and inner surfaces of the inner shell A by pins 16. In this connection it will be noted that the casting E has a shoulder 17 that abuts the adjacent ends of the inner shell A and lateral flange 11 and cooperates with the pins 16 to maintain the parts in proper position. The lateral flange 11 and casting E are then secured to the inner shell A by a hydrogen electric brazing operation. Thus, any exhaust gases escaping between the annular portion 1 of the casting and the inner shell A will pass harmlessly to the atmosphere outside the header 9.

The disk-like baffles C are spaced apart longitudinally of the inner shell A and have laterally extending attaching flanges 18 arranged end-to-end from the casting E in advance of the forward header 9 to a point in rear of the rear header 10. Thus, these flanges 18 form an additional wall or liner for the shell A throughout the length of the air chamber F to prevent exhaust gases passing from the inner shell A through any flaws therein to the air chamber. As a further precaution, these flanges 18 are secured by a hydrogen electric brazing operation to the shell A. Consequently, the copper used in brazing will seep between and under the flanges 18 so as to form a protecting layer 19 between the flanges 18 and the shell A. In this connection it will be appreciated that the layer 19 of copper just mentioned not only cooperates with the flanges 18 to give additional security against exhaust gases leaking from the interior of the shell A to the air chamber F and constitutes an excellent conductor for the heat from the exhaust gases, but also obviates rusting or burning out of the inner shell A while the heater is in use.

Each baffle C has an imperforate center 20 and is provided between said center and lateral flange 18 with radially extending elongated openings 21. Preferably these openings 21 have rounded ends 22 and 23 and taper inwardly from their outer to their inner ends. To permit exhaust gases to be as close as possible to the air chamber F and to permit the copper used in hydrogen electric brazing the lateral flanges 18 to the inner shell A to be free of any obstructions, the rounded outer ends 23 of the openings 21 are made tangent to the inner surfaces of the lateral flanges 18. Inasmuch as the openings 21 taper as aforesaid, it will be apparent that the exhaust gases will be directed toward the air chamber F, and the flaring ends 24 of the intermediate tapering strips 25 of metal will serve more effectively to conduct the heat of said gases to the lateral flanges 18 in contact with the inner shell A which constitutes one wall of said air chamber. In this connection it should also be noted that the combined area of the openings 21 in each baffle relative to the cross sectional area of the branches 4 and 5 is such as to preclude back pressure on the engine.

The annular fins D are spaced apart on the inner shell A and serve to radiate within the air chamber F the heat received from the inner shell. Preferably each fin D has a series of peripheral slots or openings 26 which permit the air within the chamber F to be closer to the inner shell and provide increased contact edges or surfaces for the air to be heated. The fins D have laterally extending attaching flanges 27 that are sleeved upon and hydrogen electric brazed to the inner shell A. Preferably these flanges 27 are spaced apart on the shell A and are provided with aligned arch portions 28 to receive the copper used in brazing. In fact, these flanges 27 are wide enough to adequately support the fins without having to be in edge-to-edge contact on the shell A. Thus, with our construction the flanges 27 may be spaced apart without danger of the fins sagging.

In the present heater, the inlet 29 and outlet 30 for air are in the same side of the outer shell B. However, the outlet 30 is larger than the inlet to prevent any restriction due to expansion of the cold air received from the inlet 29 in the chamber F. Any suitable means (not shown) may be connected to the inlet 29 for conducting air to be heated to the air chamber F, and any suitable means (not shown) may be connected to the outlet 30 for conducting the air to the interior of the vehicle to be heated.

In the process of construction the inner shell A may be formed from a single sheet of metal by a series of drawing operations in a suitable press so as to be seamless and jointless. Thus, the possibility of exhaust gases, which pass through the shell, leaking into the air chamber F is reduced to a minimum. The baffles C, fins D, headers 9 and 10, and outer shell B are also formed from sheet metal. Any suitable means (not shown) may be used to insert the baffles C into the inner shell so that the flanges 18 will be in edge-to-edge contact. The copper used in the hydrogen electric brazing operation may then be inserted through the openings 21 so as to lie flat upon the flanges 18. Preferably this copper is in wire or strip form but may be in any suitable form for the purposes described. When melted, this copper will seep between the edges of the flanges 18 and form the layer 19 between the outer surfaces of said flanges and the inner surface of the shell A. When the fins D are sleeved upon the shell A, the copper used in the hydrogen electric brazing operation may be inserted in the aligned arches 28 so that when melted it will flow between the inner surfaces of the flanges 27 and the outer surface of the shell A.

Preferably the tail pipe 3 is assembled first with the inner shell A. Then the baffles C are pressed into the shell A. Following this, the fins D are assembled upon the shell A. The header 9 is then sleeved upon the shell A, and the casting E is pressed into the adjacent end of said shell A. The pins 16 are inserted in place to initially hold the header 9 and caster E in assembled relation to the shell A. The copper used in brazing is then applied, and the assembly is conveyed through a suitable furnace. After the brazing operation, the outer shell B is put on and clinched in place by the tongues 15.

In operation, the exhaust gases from the engine will be supplied by the branches 4 and 5 of the casting to the interior of the inner shell A where they will flow through the openings 21 in the baffles C to the tail pipe 3. The heat from the gases will be conducted by the strips 25, flanges 18, and layer 19 of copper to the inner shell A which in turn will conduct the heat to the fins D in the air chamber F. The air from the atmosphere will flow through the inlet 29 into the chamber F where it will absorb the heat from the fins D. In this connection such air will flow through the peripheral slots 26 and contact the edges thereof as well as the fins proper. As a result, a maximum of heat is absorbed before the air is discharged through the outlet 30.

Figure 13:
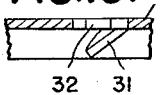
Figure 13 is a fragmentary sectional view taken substantially at right angles to Figure 12.
Figure 8:
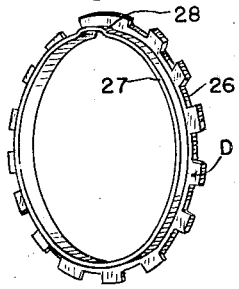
Figure 8 is a detail perspective view of one of the fins.
Figure 12:
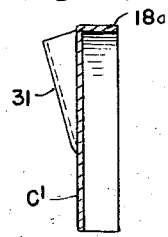
Figure 12 is a sectional view taken substantially on the line 12—12 of Figure 11.
Figure 10:
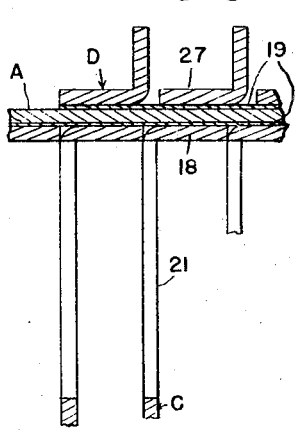
Figure 10 is an enlarged fragmentary longitudinal sectional view through the inner shell and adjacent parts.
Figure 6:
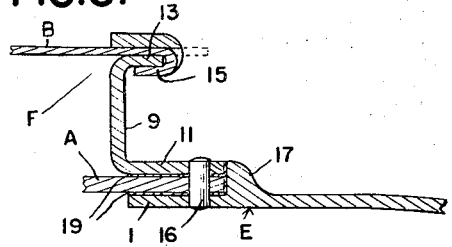
Figure 6 is a sectional view taken substantially on the line 6—6 of Figure 5.
Figure 5:
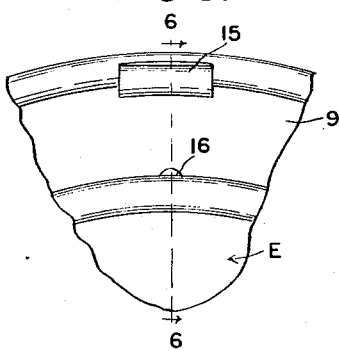
Figure 5 is a fragmentary enlargement of the front end of the heater.
Figure 9:
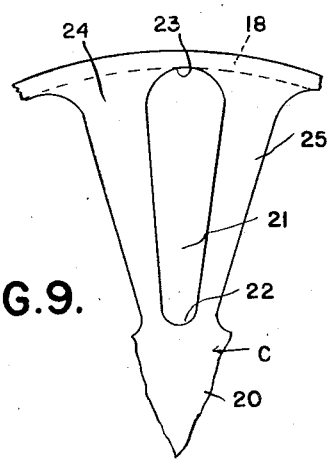
Figure 9 is an enlarged fragmentary elevation of one of the baffles.

In Figures 11, 12 and 13 we have illustrated a slight modification in which the baffles C' have radially extending struck-out wings 31 which provide radially extending elongated openings 32 for the exhaust gases. As shown, the wings 31 taper toward the center of the baffles and thus cause the exhaust gases to be directed in a spiral toward the attaching flanges 18ᵃ and inner shell A'. As a result, a relatively quiet action is obtained. Otherwise, the construction and operation are substantially the same as in Figures 1 to 10, inclusive.

What we claim as our invention is:

1. In the manufacture of heat exchange devices, the steps of casting a fitting having a tubular part and a substantially right angular shoulder on said part in spaced relation to the free end thereof, drawing from a sheet of metal a seamless and jointless tubular shell, pressing from sheet metal a header having a laterally projecting annular flange, sleeving the annular flange of the header upon the shell at one end thereof so that the free end of the flange is substantially flush with the adjacent end of the shell, inserting the tubular part of the casting into the end aforesaid of the shell so that the flush ends of the flange and shell substantially abut said shoulder, pinning together the annular flange, shell and tubular part aforesaid, and melting a bonding material so that it will flow between the shoulder of the fitting and the adjacent ends of the shell and annular flange of the header, between the annular flange of the header and the shell, and between the shell and tubular part of the fitting to securely tie together said parts.

2. In the manufacture of heat exchange devices, the steps of drawing from a sheet of metal a tubular shell, stamping from sheet metal a number of disk-like baffles, each being circular in shape and having a laterally projecting annular flange at its periphery for engagement with the inner walls of the shell and having a circular central portion, forming in each disk between the flange and circular central portion a circular series of elongated openings having curved outer ends tangent to the inner surface of the annular flange, and substantially straight sides converging inwardly from the extremities of the curved outer ends to the circular central portion aforesaid, and securing the annular flanges of the baffles to the inner walls of said shell by laying elongated bodies of bonding material in the openings flush against the curved outer ends thereof and the inner surface of the lateral flanges and melting such bonding material.

3. In the manufacture of heat exchange devices, the steps of forming a sheet of metal into a tubular shell, stamping from sheet metal a number of disk-like baffles, each being circular in shape and having a laterally projecting annular flange at its periphery for engagement with the inner walls of the shell and having a circular central portion, forming in each disk between the flange and circular central portion a circular series of elongated openings having curved outer ends tangent to the inner surface of the annular flange, and securing the annular flanges of the baffles to the inner walls of said shell by laying bodies of bonding material in the openings flush against the curved outer ends thereof and the inner surface of the lateral flanges and melting such bonding material.

ALFRED F. MILLINGTON.
LEWIS W. WELCH.